(12) United States Patent
Serener-Thielmann

(10) Patent No.: US 7,125,511 B2
(45) Date of Patent: Oct. 24, 2006

(54) VENTING DEVICE WHICH STOPS THE SPEWS ON THE TIRE

(75) Inventor: Tayfun Serener-Thielmann, Wiesbaden (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 92 days.

(21) Appl. No.: 10/936,311

(22) Filed: Sep. 8, 2004

(65) Prior Publication Data

US 2005/0069599 A1    Mar. 31, 2005

(30) Foreign Application Priority Data

Sep. 26, 2003    (DE)    ................ 103 44 912

(51) Int. Cl.
B29C 35/02    (2006.01)
(52) U.S. Cl. .............. 264/326; 425/28.1; 425/472; 425/812
(58) Field of Classification Search ............. 425/28.1, 425/472, 812; 249/141; 264/326
See application file for complete search history.

(56) References Cited

U.S. PATENT DOCUMENTS 4,795,331 A * 1/1989 Cain et al. ................. 425/28.1
6,561,779 B1 * 5/2003 Nitsch et al. ............... 425/28.1
6,808,376 B1 * 10/2004 Serener-Thielmann ..... 425/28.1
6,817,848 B1 * 11/2004 Ishihara ..................... 425/28.1

FOREIGN PATENT DOCUMENTS

DE    199 00 596    7/2000

* cited by examiner

Primary Examiner—James P. Mackey
(74) Attorney, Agent, or Firm—June E. Rickey; Bernd Kutsch

(57) ABSTRACT

A blocking member for use in a vent bore in a mold for the manufacture of technical rubber products, in particular to the manufacture of vehicle tires, wherein each blocking member has a tubular hollow body which can be fixed in force-transmitting manner in the respective bore, the hollow body having a sealing part formed thereon in one piece with it. The sealing part has a plate element disposed at the inner side of the mold which is provided in its plate surface with at least one slot opening and the peripheral rim of the plate element projects at least regionally beyond the bore diameter of the associated vent bore and contacts the inner side of the mold.

15 Claims, 2 Drawing Sheets

VENTING DEVICE WHICH STOPS THE SPEWS ON THE TIRE

PRIORITY CLAIM

This application claims the benefit under 35 U.S.C. §119 of German Application No. DE 103 44 912.4, filed on 26 Sep. 2003.

FIELD OF THE INVENTION

The invention relates to a blocking member for vent bores in molds for the manufacture of technical rubber products, in particular for the manufacture of vehicle tires. Furthermore, the invention is directed to a vulcanization mold which is equipped with one or more such blocking members.

BACKGROUND OF THE INVENTION

Blocking members of this kind and a vulcanization mold equipped therewith are known from DE 199 00 596 A1. In this arrangement each blocking member consists of a pin-like central body which can be fixed in force-transmitted manner into the respective vent bore and also of a sealing part connected to the central body which has a surface region disposed at the inner side of the mold with at least one aperture and which, together with the mold side end face of the central body, forms a flow path for the air with a pronounced angled shape following the aperture. This known embodiment has proved itself in practice.

SUMMARY OF THE INVENTION

The object of the present invention is to improve the known blocking members with respect to their ability to function over long periods of time and simultaneously to enable more cost-favorable manufacture.

This object is satisfied in accordance with the invention essentially in that each blocking member has a tubular hollow body which can be fixed in a force-transmitting manner in the respective bore, the hollow body having a sealing part formed thereon in one piece with it, the sealing part having a plate element disposed at the inner side of the mold which is provided in its plate surface with at least one slot opening and with its peripheral rim projecting at least regionally beyond the bore diameter of the associated vent bore and contacting the inner side of the mold.

Through the one-piece design of the blocking member, in particular in the form of a punched and bent part, the blocking member can be manufactured in a particularly cost-favorable manner and moreover the installation is simplified. This is also of substantial importance having regard to the large number of blocking members required for each vulcanization mold. The blocking member is particularly insensitive to deposits during the heating, again as a consequence of the one-piece design and the overall layout, whereby the dangers of blockages can be practically removed. Furthermore, the design of the blocking member renders it insensitive to sand cleaning, laser cleaning or dry ice cleaning of the mold provided with the blocking members.

In order to make the insertion process of the blocking members into the vent bores of the vulcanisation mold particularly simple, the hollow body has at least one elongate slot extending substantially in the axial direction in order to provide a radial elasticity and it can taper towards its end remote from the inner side of the mold.

A particularly firm and reliable seating of the blocking member in the respective vent bore is preferably achieved in that the hollow body has at least bead-like bulge extending in the peripheral direction which is dimensioned such that on insertion of the hollow body into the bore the axial slots present in the hollow body are closed and the bulge extending substantially over the periphery of the hollow body is compressed with axial elongation of the hollow body. In this way high clamping and holding forces can be produced.

In order to provide an additional security against the blocking members being pulled out during demolding processes, the hollow body can be provided at its outer side with at least two diametrically oppositely disposed spring barbs which are effective opposite to the pull-out direction and which can be realized in a simple manner by pressing them out from the wall material of the hollow body.

The slot openings provided in the plate surface of the blocking member which enable a passage of air are preferably formed by a pressing in process in which the material of the plate element in the longitudinal direction of the slot tears over a desired part region, whereby defined narrow slot openings can be deformed in which as a rule no material sticks. However, should some material pass through the gap in an exceptional case then this material is torn off during demolding and falls into the inner space of the hollow body without disturbing subsequent vulcanization processes.

In accordance with one variant of the invention the plate element is made oval with respect to its peripheral contour, whereby a space-saving effect is achieved and the individual blocking members can be arranged particularly closely alongside one another.

The blocking member of the invention preferably consists of a stamped and bent part, with the hollow body being formed by two half shells which include longitudinal slots between them and with the plate element being carried by connecting lugs starting from half shells which lie diametrically opposite to one another and merge into the plate surface between cuts provided in the rim. Stamped and bent parts of this kind can be precisely manufactured in a particularly economic manner by means of suitable automatic machines.

The invention is further directed to a vulcanization mold equipped with blocking members of the described kind and also generally to the use of such blocking members in vulcanization molds for the manufacture of technical rubber products.

Further advantageous embodiments of the invention are set forth in the subordinate claims and will be explained in the following description of an embodiment with reference to the accompanying drawings.

DETAILED DESCRIPTION OF THE INVENTION

Figure 1:
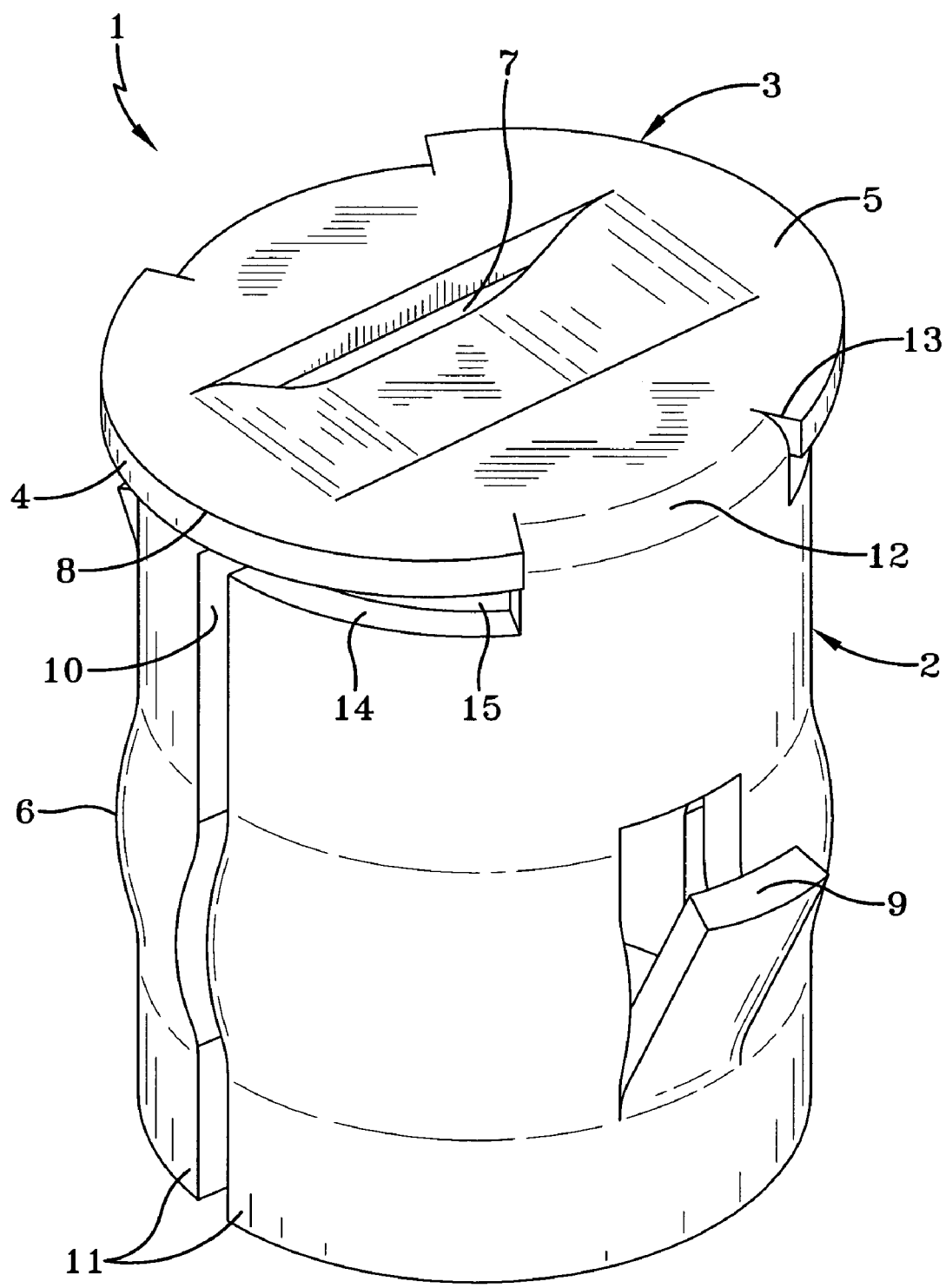
FIG. 1 shows an oblique perspective view of a blocking member of a vulcanization mold in accordance with the invention.

FIG. 1 shows a blocking member 1 manufactured from a stamped and bent part which consists of a hollow body 2 and a sealing part 3 connected to the hollow body 2 via connection lugs 12.

The sealing part 3 is formed by a plate element 4 the peripheral contour of which is circular or oval and the plate surface 5 of which is flat. The plate element has, in the illustrated embodiment, two slit openings 7 extending parallel to one another which are formed in the plate surface 5 by a pressing and/or stamping process.

This pressing process is effected in such a way that the material of the plate element 4 tears while forming narrow edge side slot openings 7 which can be pre-set.

The sealing part 3 lies, in the state in which it is inserted into the vent bore of the vulcanization mold, with its peripheral edge 8 against the inner surface of the vulcanization mold and minimal slots can be formed between the plate element 4 and the bore in the vulcanization mold, in particular with an oval design of the plate element 4. These minimal slots ensure an additional air transport out of the mold but practically no material can stick in them.

The hollow body 2 which is to be inserted into the respective vent bore consists in the illustrated embodiment of two half shells 11 which are connected via the already mentioned connection lugs 12 to the sealing part 3. In order to facilitate the introduction of the hollow body 2 into the respective vent bore this hollow body 2 can taper towards its free end.

Between the two half shells 11 of the hollow body 2 there is in each case formed a longitudinal slot 10 extending in the axial direction and at least one bulge 6 extends in the manner of a bead in the peripheral direction of the hollow body 2. Via this bulge clamping with practically line contact is established between the hollow body 2 and the vent bore into which the hollow body 2 is inserted. Thus, with respect to the hollow body 2 three functional sections arise, namely a lower insertion region, a clamping region which is preferably disposed in the central part and an upper support region for the valve element which brings about the 90° air deflection which is important for the function.

Since essentially no danger of bending exists during insertion of the blocking member 1 into the corresponding vent bore, due to the design of the hollow body 2, relatively small material thicknesses can be used for the blocking member. Despite this high holding forces result in the vent bore, which is in particular a consequence of the fact that on introducing the blocking member into the vent bore the longitudinal gaps 10 are initially closed as a result of the bulge 6 that is present and that the bead formed by the bulge 6 then enters into operation by elongation of the hollow body 2 in the axial direction and produces the high holding forces which are desired.

In addition the blocking member 1 can be secured against being pulled out of the vent bores during the respective demolding processes by barbs 9 which are pressed out of the material of the hollow body 2 in tab-like manner and are effective against the pull-out direction by clawing engagement with the inner wall of the vent bore.

The free mobility of the half shells 11 in the radial direction during insertion into the vent bore is enabled by the gaps 15 which are present between the end face of the hollow body disposed towards the inner side of the mold and the sealing part. The connecting lugs between the hollow body 2 and the sealing part 3 merge into the plate element 4 via cuts 13.

Figure 2:
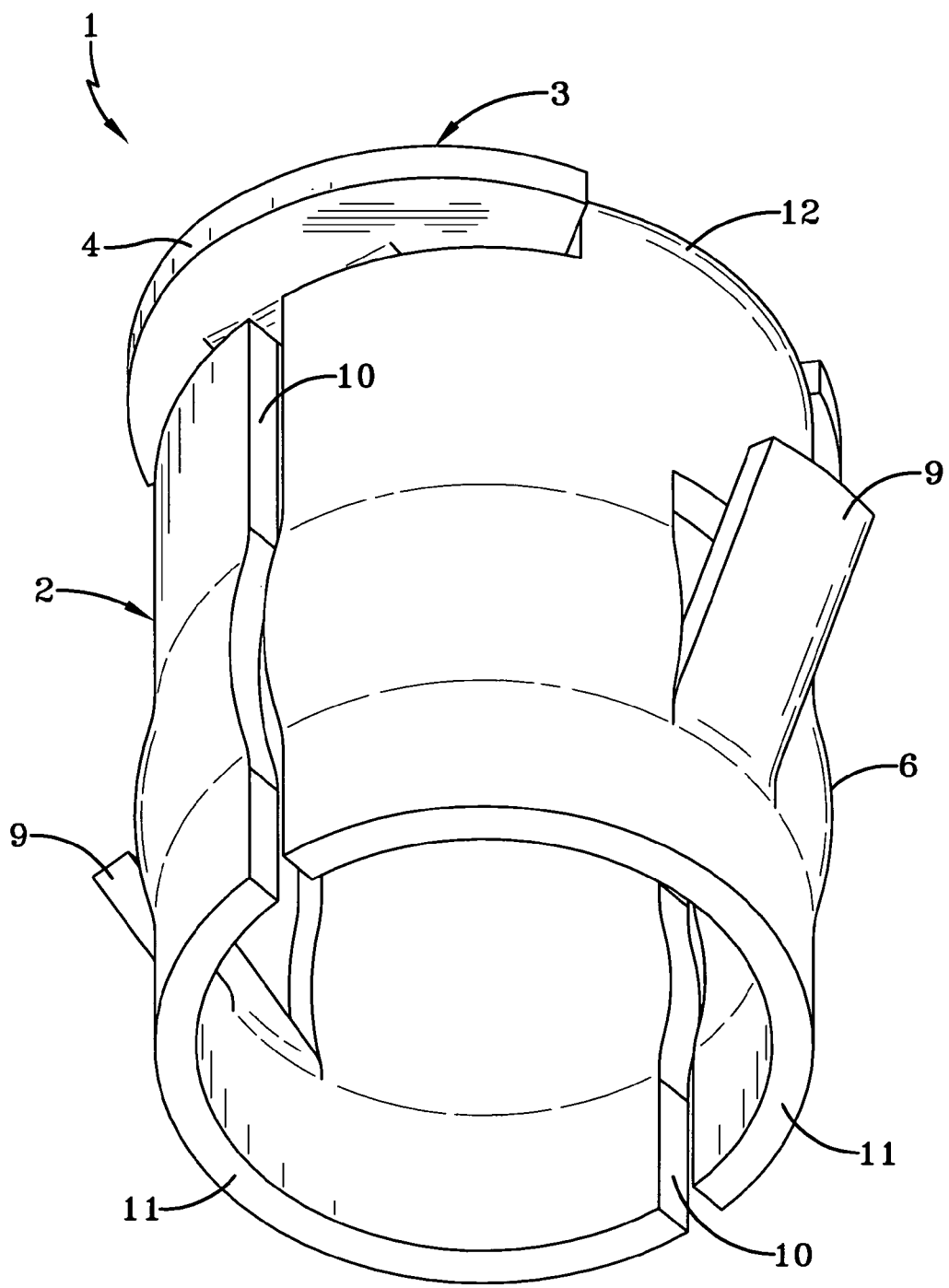
FIG. 2 shows an oblique perspective view of the blocking member of FIG. 1 from the underside.

The oblique perspective view shown in FIG. 2 from below allows the components of the blocking member of the invention explained in conjunction with FIG. 1 and above all the two half shells 11 of the hollow body 2 to be clearly seen. In this connection it is also evident that the two mutually oppositely disposed barbs are formed in the region of the hollow body 2 in which the bulge 6 is also located. The length of the barbs 9 and their angling with respect to the longitudinal axis of the hollow body 2 is selected so that the desired clawing effect is also ensured during introduction of the blocking member into the respective vent bore, even taking account of the peripheral reduction of the hollow body 2 by closing of the longitudinal slots 10.

What is claimed is:

1. A blocking member for use in a vent bores of a mold for the manufacture of rubber products, the mold having a wall defining at least a part of a mold cavity and having an inner side adjacent said mold cavity and a vent bore extending through said wall away from said inner side, said blocking member comprising: a tubular hollow body a sealing part formed on said hollow body in one piece with it, said sealing part having a plate element, said plate element having a plate surface, at least one slot opening formed in said plate surface and a peripheral rim, said peripheral rim projecting radially in use at least regionally beyond said associated vent bore and contacting said inner side.

2. A blocking member in accordance with claim 1, said hollow body having at least one elongate slot extending in an axial direction to provide radial elasticity of said hollow body.

3. A blocking member in accordance with claim 1, said hollow body having an end remote from said plate element and tapering towards said end.

4. A blocking member in accordance with claim 3, said hollow body tapering conically.

5. A blocking member in accordance with claim 1, said hollow body having a peripheral direction and at least one bulge extending in said peripheral direction.

6. A blocking member in accordance with claim 5 said bulge being approximately of ring-like shape and extending at least substantially over the periphery of said hollow body.

7. A blocking member in accordance with claim 6, said bulge being dimensioned such that on inserting the hollow body into vent bore said at least one longitudinal slot present in said hollow body is closed and said bulge is compressed with elongation of the hollow body.

8. A blocking member in accordance with claim 1, said hollow body having an outer side and at least first and second spring claws, each spring claw having a free end disposed facing towards said plate element.

9. A blocking member in accordance with claim 1, said plate element being flat and having a circular peripheral contour.

10. A blocking member in accordance with claim 1, said plate element being flat and having an oval peripheral contour.

11. A blocking member in accordance with claim 1, there being at least first and second slot openings in said plate surface, said slot openings having been formed by a pressing in process.

12. A blocking member comprising: a tubular hollow body being formed by two half shells which include longitudinal slots between them, a sealing part formed on said hollow body in one piece with it, said sealing part having a plate element, said plate element having a plate surface and said plate element being carried by connecting lugs which start from the half shells, which lie diametrically opposite to one another and merge into said plate surface between cuts provided in a rim of said plate element.

13. A blocking member in accordance with claim 12, there being at least one gap formed between said plate element and an end face of said hollow body adjacent said plate element, said at least one gap being provided in a region disposed adjacent to said connecting lug.

14. Vulcanization mold for the manufacture of technical rubber products, in particular for the manufacture of vehicle tires, having a plurality of vent bores extending from an inner side of said mold through a side wall thereof and a respective blocking member mounted in each of said vent bores and adapted to at least substantially block the penetration of a molding composition into the associated vent bore and to simultaneously enable an extraction of air, each said blocking member having a tubular hollow body adapted to be fixed in use in force-transmitting manner in said vent bore, and a sealing part formed on said hollow body in one piece with it, said sealing part having a plate element disposed in use at said inner side of the mold, said plate element having a plate surface, at least one slot opening formed in said plate surface and a peripheral rim, said peripheral rim projecting radially in use at least regionally beyond said associated vent bore and contacting said inner side.

15. A method of venting a mold comprising the steps of: placing a blocking member in a vent bore of a mold, the mold having a wall defining at least a part of a mold, cavity and having an inner side adjacent said mold cavity and a vent bore extending through said wall away from said inner side, said blocking member having a tubular hollow body adapted to be fixed in use in force-transmitting manna in said vent bore, and a sealing part formed on said hollow body in one piece with it, said sealing part having a plate element disposed in use at said inner side of the mold, said plate element having a plate surface, at least one slot opening formed in said plate surface and a peripheral rim, said peripheral rim projecting radially in use at least regionally beyond said associated vent bore and contacting said inner side.

* * * * *